United States Patent
Kandula et al.

(10) Patent No.: US 9,092,269 B2
(45) Date of Patent: Jul. 28, 2015

(54) OFFLOADING VIRTUAL MACHINE FLOWS TO PHYSICAL QUEUES

(75) Inventors: Srikanth Kandula, Redmond, WA (US); Changhoon Kim, Bellevue, WA (US); Alireza Dabagh, Kirkland, WA (US); Deepak Bansal, Sammamish, WA (US); David A. Maltz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/529,747

(22) Filed: Jun. 21, 2012

(65) Prior Publication Data

US 2013/0343399 A1 Dec. 26, 2013

(51) Int. Cl.
*H04L 12/861* (2013.01)
*G06F 9/50* (2006.01)
(Continued)

(52) U.S. Cl.
CPC .......... *G06F 9/5077* (2013.01); *G06F 9/45533* (2013.01); *H04L 41/0893* (2013.01);
(Continued)

(58) Field of Classification Search
CPC ............... H04L 49/9068; H04L 49/90; H04L 2012/5681; H04L 49/70; H04L 45/586; H04L 45/38; H04L 41/0896; H04L 12/5689; H04L 12/5696; H04L 41/0893; H04L 47/20; H04L 47/215; H04L 47/10; H04L 49/3045; H04L 47/2441; H04L 49/254; H04L 47/12; H04L 49/9047; H04L 47/621; H04L 47/6215; G06F 9/5077; G06F 9/45558; G06F 2009/45595; G06F 9/455333
USPC ......... 370/235, 255, 401, 412, 463, 218, 230, 370/250, 390, 392, 419; 718/102, 1, 104; 709/238, 232, 233
See application file for complete search history.

(56) References Cited

U.S. PATENT DOCUMENTS 7,190,668 B1 3/2007 Francis et al.
7,274,700 B2 9/2007 Jin et al.
(Continued)

FOREIGN PATENT DOCUMENTS

WO WO 2010025127 3/2010

OTHER PUBLICATIONS

Georg, M.; Jechlitschek, C.; Gorinsky, S., "Improving Individual Flow Performance with Multiple Queue Fair Queuing," Quality of Service, 2007 Fifteenth IEEE International Workshop on , vol., No., pp. 141,144, Jun. 21-22, 2007.*

(Continued)

*Primary Examiner* — Edan Orgad
*Assistant Examiner* — Ivan O Latorre
(74) *Attorney, Agent, or Firm* — Ben Tabor; Stein Dolan; Micky Minhas (57) ABSTRACT

The present invention extends to methods, systems, and computer program products for offloading virtual machine flows to physical queues. A computer system executes one or more virtual machines, and programs a physical network device with one or more rules that manage network traffic for the virtual machines. The computer system also programs the network device to manage network traffic using the rules. In particular, the network device is programmed to determine availability of one or more physical queues at the network device that are usable for processing network flows for the virtual machines. The network device is also programmed to identify network flows for the virtual machines, including identifying characteristics of each network flow. The network device is also programmed to, based on the characteristics of the network flows and based on the rules, assign one or more of the network flows to at least one of the physical queues.

20 Claims, 5 Drawing Sheets

(51) Int. Cl.
- *H04L 12/931* (2013.01)
- *H04L 12/713* (2013.01)
- *H04L 12/721* (2013.01)
- *H04L 12/24* (2006.01)
- *G06F 9/455* (2006.01)

(52) U.S. Cl.
CPC .............. *H04L 45/38* (2013.01); *H04L 45/586* (2013.01); *H04L 49/70* (2013.01); *H04L 49/90* (2013.01); *H04L 49/9068* (2013.01)

(56) References Cited

U.S. PATENT DOCUMENTS

| | | | |
|---|---|---|---|
| 7,936,770 B1 | 5/2011 | Frattura et al. | |
| 2002/0062333 A1 | 5/2002 | Anand et al. | |
| 2004/0258043 A1 | 12/2004 | Engbersen et al. | |
| 2005/0190779 A1* | 9/2005 | Hoffman et al. | 370/412 |
| 2006/0045014 A1 | 3/2006 | Charzinski | |
| 2007/0098010 A1 | 5/2007 | Dube et al. | |
| 2007/0174850 A1 | 7/2007 | El Zur | |
| 2008/0271134 A1 | 10/2008 | Johnson et al. | |
| 2010/0014526 A1 | 1/2010 | Chavan et al. | |
| 2010/0054129 A1* | 3/2010 | Kuik et al. | 370/235 |
| 2010/0085975 A1 | 4/2010 | Wang et al. | |
| 2010/0150164 A1* | 6/2010 | Ma | 370/412 |
| 2010/0169536 A1 | 7/2010 | Shedel et al. | |
| 2010/0333189 A1 | 12/2010 | Droux et al. | |
| 2011/0103389 A1 | 5/2011 | Kidambi | |
| 2011/0107331 A1 | 5/2011 | Evans et al. | |
| 2011/0231568 A1 | 9/2011 | Bansal et al. | |
| 2011/0314469 A1 | 12/2011 | Qian et al. | |
| 2011/0320632 A1* | 12/2011 | Karino | 709/238 |
| 2012/0079478 A1 | 3/2012 | Galles et al. | |
| 2012/0093034 A1* | 4/2012 | Kamath et al. | 370/255 |
| 2012/0124572 A1 | 5/2012 | Cunningham et al. | |
| 2012/0250686 A1* | 10/2012 | Vincent et al. | 370/392 |
| 2012/0324442 A1* | 12/2012 | Barde | 718/1 |

OTHER PUBLICATIONS

"Virtualized Networking Enhancements in NDIS 6.30", Retrieved on: Jun. 22, 2012, Available at: http://msdn.microsoft.com/en-us/library/windows/hardware/hh440272(v=vs.85).aspx.

"Broadcom Ethernet Network Controller Enhanced Virtualization Functionality", Published on: Oct. 2009, Available at: http://www.broadcom.com/collateral/wp/Virtualization-WP100-R.pdf.

Y. Luo et al., "Accelerated Virtual Switching with Programmable NICs for Scalable Data Center Networking", SIGCOMM 2010, Sep. 3, 2010, available at <<http://conferences.sigcomm.org/sigcomm/2010/papers/visa/p65.pdf>>.

Jiuxing Liu et al., "High Performance VMM-Bypass I/O in Virtual Machines", Proceedings of USENIX 2006 Annual Technical Conference, Jun. 1, 2006, pp. 29-42. Available at <<http://www.cse.unsw.edu.au/~cs9242/06/exam/paper2.pdf>>.

Kaushik Kumrar Ram et al., "sNICh: Efficient Last Hop Networking in the Data Center", ACM/IEEE Symposium on Architectures for Networking and Communications Systems (ANCS), Oct. 25, 2010, pp. 1-12.

Hideyuki Shimonishi et al., "Virtualized Network Infrastructure Using Open Flow", IEEE/IFIP Network Operations and Management Symposium Workshops (NOMS Wksps), Apr. 19, 2010, pp. 74-79.

U.S. Appl. No. 13/551,064, filed Jul. 17, 2012, Zuo et al.
U.S. Appl. No. 61/613,824, filed Mar. 21, 2012, Zuo et al.
Office Action dated Feb. 24, 2014 cited in U.S. Appl. No. 13/551,064.
Notice of Allowance dated Sep. 4, 2014 cited in U.S. Appl. No. 13/551,064.

* cited by examiner

OFFLOADING VIRTUAL MACHINE FLOWS TO PHYSICAL QUEUES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Some computer systems are configured to provide virtualized environments for hosting one or more virtual machines. For example, para-virtualized execution environments include hypervisors. Hypervisors provide a parent partition (sometimes referred to as a host) and one or more child partitions. The parent partition communicates with and manages physical hardware, and is configured to run a host operating system and to manage a virtualization stack. Each child partition is configured as a "virtual machine" that runs a corresponding guest operating system.

Common scenarios in virtualization involve managing network packets among virtual machines that are executing at a virtualization host computer system, and to manage network packets flowing between the virtual machines and computers systems remote from the host computer system. As such, virtualization stacks at host operating systems may include networking virtualization stacks, including virtual switches. Virtual switches are configured to intercept, inspect, and manipulate network packets being communicated in connection with the virtual machines. Doing so, however, can be inefficient, as it can cause frequent and costly (e.g., in terms of CPU usage) context switches between the host operating system and guest operating systems and can introduce latency in network communications.

Recent developments in virtualization include Single-Root I/O Virtualization (SRIOV). SRIOV is an extension to the Peripheral Component Interconnect Express (PCIe) bus architecture that enables PCIe devices to communicate directly with child partitions. As such, SRIOV enables PCIe devices to expose themselves to child partitions/virtual machines through the hypervisor. For example, a SRIOV-compliant physical Network Interface Card (NIC) or switch may present a physical function to the parent partition and present one or more virtual functions to corresponding child partitions. The host operating system can then include a physical function driver that communicates with the physical function, and each guest operating system can execute a virtual function driver that communicates with the corresponding virtual function. The physical NIC can then communicate network packets directly with guest operating systems (by-passing the host operating system), which can greatly improve network performance.

Despite the advances that SRIOV brings, there remain some inefficiencies in the area of network packet processing in virtualization environments.

BRIEF SUMMARY

The present invention extends to methods, systems, and computer program products for offloading virtual machine network flows to physical queues of network hardware. As such, embodiments of the present invention can enable virtual machine network traffic to pass directly between virtual machines and physical hardware, bypassing the parent partition and avoiding the inefficiencies associated with routing network traffic through the parent partition. In particular, embodiments of the present invention include configuring physical network hardware to assign network flows from virtual machines to physical queues at the physical network hardware, and potentially to assign more network flows to physical queues than the number of physical queues that exist at the physical network hardware.

In some embodiments, a method for managing network traffic includes a computer system executing one or more virtual machines. The method also includes the computer system programming a physical network device with one or more rules that are used by the physical network device to manage network traffic for the virtual machines. In particular, the physical network device is programmed to determine availability of one or more physical queues at the physical network device. The physical queues are usable for processing network flows for the virtual machines. The physical network device is also programmed to identify a plurality of network flows for the virtual machines, including identifying characteristics of each of the network flows. The physical network device is also programmed to assign one or more of the plurality of network flows to at least one of the physical queues based on the characteristics of the network flows and based on the rules.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an exemplary computing system on which the principled described herein may be employed.

DETAILED DESCRIPTION

The present invention extends to methods, systems, and computer program products for offloading virtual machine network flows to physical queues of network hardware. As such, embodiments of the present invention can enable virtual machine network traffic to pass directly between virtual machines and physical hardware, bypassing the parent partition and avoiding the inefficiencies associated with routing network traffic through the parent partition. In particular, embodiments of the present invention include configuring physical network hardware to assign network flows from virtual machines to physical queues at the physical network hardware, and potentially to assign more network flows to physical queues than the number of physical queues that exist at the physical network hardware.

First, some introductory discussion regarding general computing systems and computing environments in or on which the principles described herein may be employed will be described with respect to FIGS. 1-3. Then the basic principles for offloading virtual machine network flows to physical queues of network hardware will be described with respect to FIGS. 4 and 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having stored thereon computer-executable instructions that may be executed by the processor(s). The memory may take any form and may depend on the nature and form of the computing system. A computing system may be distributed over a network environment and may include multiple constituent computing systems.

Embodiments described herein may comprise or utilize a special purpose or general-purpose computer including computer hardware, such as, for example, one or more processors and system memory. For example, FIG. 1 illustrates an exemplary computing system 100. As illustrated in FIG. 1, in its most basic configuration, computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system 100 is distributed, the processing, memory and/or storage capability may be distributed as well.

As used herein, the term "module" or "component" can refer to software objects or routines that execute on the computing system 100. The different components, modules, engines, and services described herein may be implemented as objects or processes that execute on the computing system 100 (e.g., as separate threads).

In the description that follows, embodiments are described with reference to acts that are performed by one or more computing systems, such as the computing system 100. If such acts are implemented in software, one or more processors of the associated computing system that performs the acts direct the operation of the computing system in response to having executed computer-executable instructions. An example of such an operation involves the manipulation of data. Within the context of the computing system 100, computer-executable instructions (and the manipulated data) may be stored in the memory 104. Computing system 100 may also contain communication channels 108 that allow the computing system 100 to communicate with other message processors over, for example, network 110.

Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes recordable-type storage media, such as RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network (e.g., the network 110) and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described herein using language specific to structural features and/or methodological acts, it is to be understood that the subject matter defined in the appended claims is not necessarily limited to the described features or acts described herein. Rather, the features and acts described herein are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
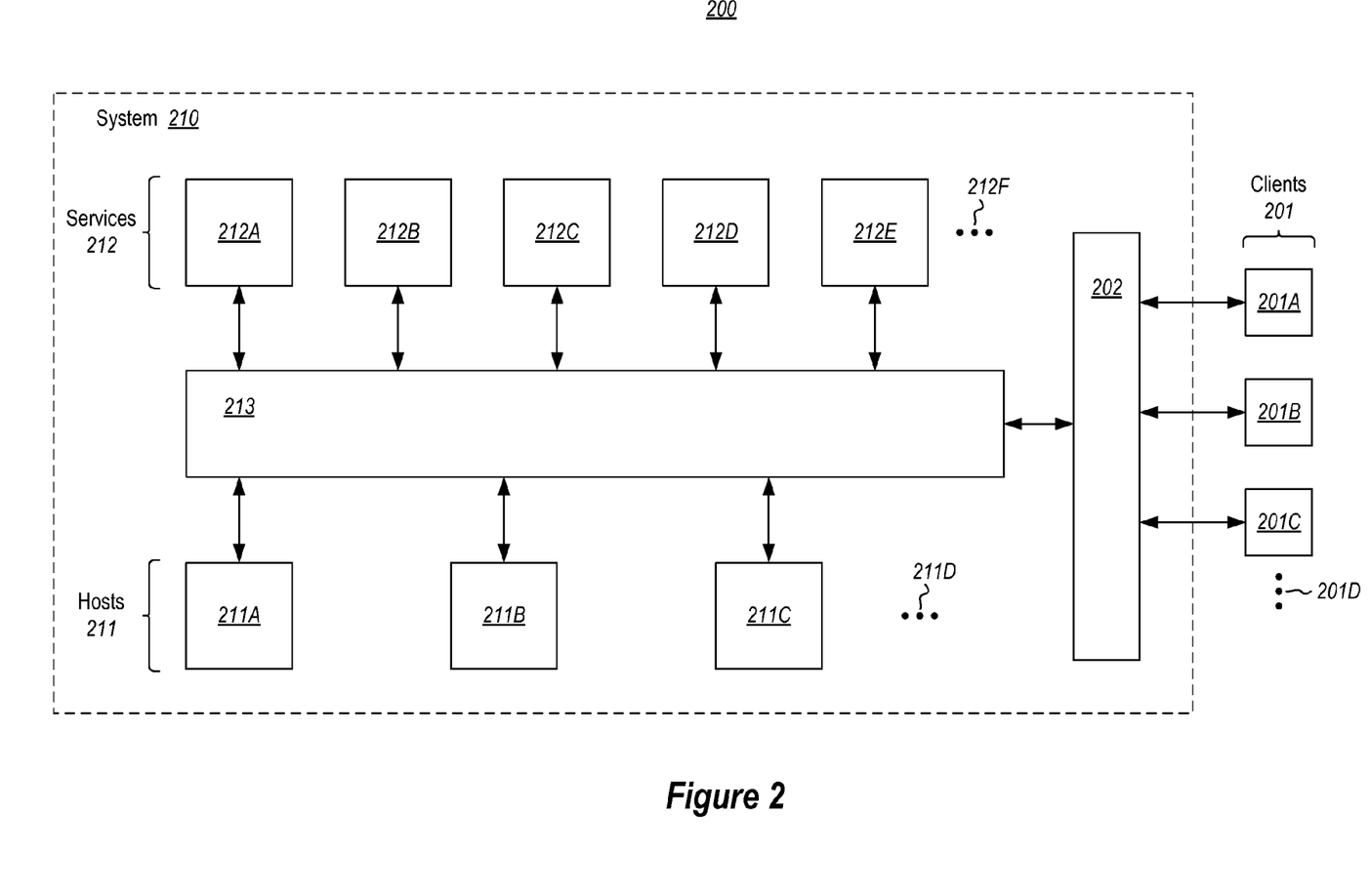
FIG. 2 illustrates an environment in which the principles described herein may be employed.
Figure 3:
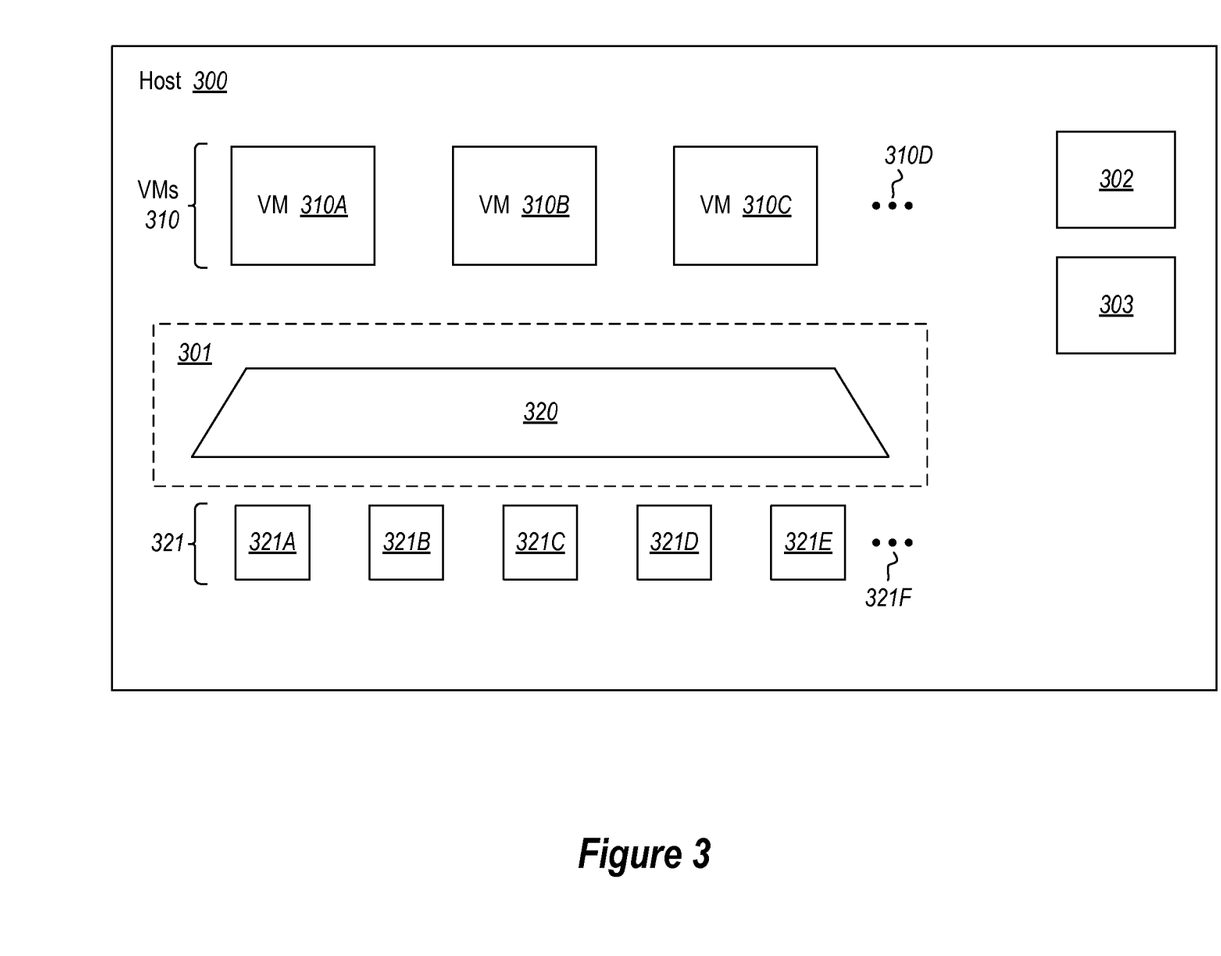
FIG. 3 illustrates a host on which the principles described herein may be employed.

FIG. 2 abstractly illustrates an environment 200 in which the principles described herein may be employed. The environment 200 includes multiple clients 210 interacting with a system 210 using an interface 202. The environment 200 is illustrated as having three clients 201A, 201B and 201C, although the ellipses 201D represents that the principles described herein are not limited to the number of clients interfacing with the system 210 through the interface 202. The system 210 may provide services to the clients 201 on-demand, and thus the number of clients 201 receiving services from the system 210 may vary over time.

Figure 1:
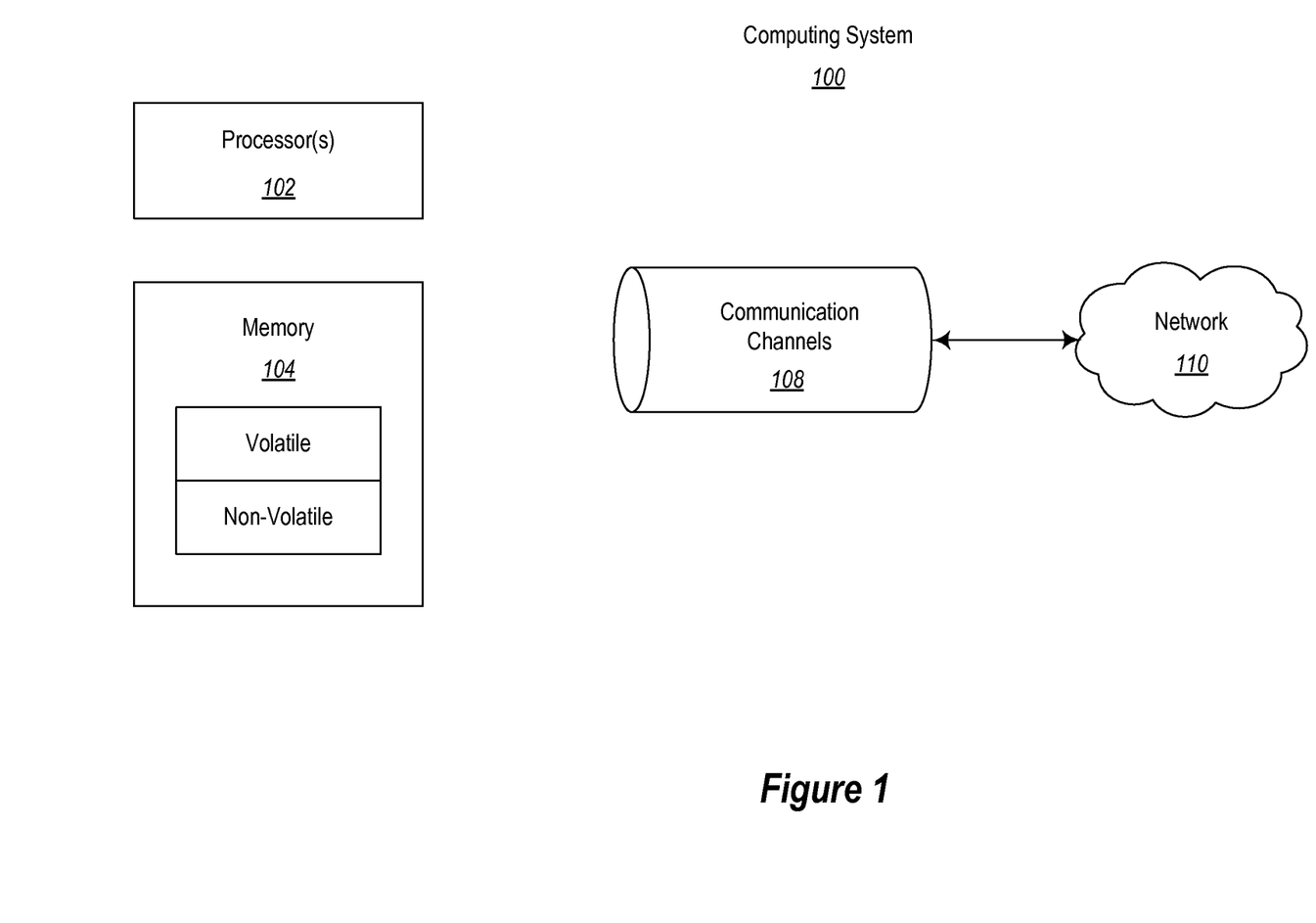

One or more of the clients 201 may, for example, be structured as described above in accordance with computing system 100 of FIG. 1. Alternatively or in addition, one or more of the clients 201 may be an application or other software module that interfaces with the system 210 through the interface 202. The interface 202 may be an application program interface (API) that is defined in such a way that any computing system or software entity that is capable of using the API may communicate with the system 210.

The system 210 may be a distributed system, although this is not required. In one embodiment, the system 210 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

As depicted, the system 210 includes multiple hosts 211, that are each capable of running virtual machines. Although the system 200 might include any number of hosts 211, there are three hosts 211A, 211B and 211C illustrated in FIG. 2, with the ellipses 211D representing that the principles described herein are not limited to the exact number of hosts that are within the system 210. There may be as few as one, with no upper limit. Furthermore, the number of hosts may be static, or might dynamically change over time as new hosts are added to the system 210, or as hosts are dropped from the system 210. Each of the hosts 211 may be structured as described above for the computing system 100 of FIG. 1.

Each host is capable of running one or more, and potentially many, virtual machines. For instance, FIG. 3 abstractly illustrates a host 300 in further detail. As an example, the host 300 might represent any of the hosts 211 of FIG. 2. In the case of FIG. 3, the host 300 is illustrated as operating three virtual machines 310 including virtual machines 310A, 310B and 310C. However, the ellipses 310D once again represents that the principles described herein are not limited to the number of virtual machines running on the host 300. There may be as few as zero virtual machines running on the host with the only upper limit being defined by the physical capabilities of the host 300.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. For instance, referring to FIGS. 2 and 3, suppose that the host 300 of FIG. 3 represents the host 211A of FIG. 2, and that the virtual machine 310A is assigned to client 201A (referred to herein as "the primary example"), the virtual machine 310A might generate the desktop image or instructions and dispatch such instructions to the corresponding client 201A from the host 211A via a service coordination system 213 and via the system interface 202.

As the user interacts with the desktop at the client, the user inputs are transmitted from the client to the virtual machine. For instance, in the primary example and referring to FIGS. 2 and 3, the user of the client 201A interacts with the desktop, and the user inputs are transmitted from the client 201 to the virtual machine 310A via the interface 201, via the service coordination system 213 and via the host 211A.

The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 300 includes a hypervisor 320 that emulates virtual resources for the virtual machines 310 using physical resources 321 that are abstracted from view of the virtual machines 310. The hypervisor 321 also provides proper isolation between the virtual machines 310. Thus, from the perspective of any given virtual machine, the hypervisor 320 provides the illusion that the virtual machine is interfacing with a physical resource, even though the virtual machine only interfaces with the appearance (e.g., a virtual resource) of a physical resource, and not with a physical resource directly. In FIG. 3, the physical resources 321 are abstractly represented as including resources 321A through 321F. Examples of physical resources 321 including processing capacity, memory, disk space, network bandwidth, media drives, and so forth.

The host 300 may operate a host agent 302 that monitors the performance of the host, and performs other operations that manage the host. Furthermore, the host 300 may include other components 303, such as a virtual switch as described later.

Referring back to FIG. 2, the system 200 also includes services 212. In the illustrated example, the services 200 include five distinct services 212A, 212B, 212C, 212D and 212E, although the ellipses 212F represents that the principles described herein are not limited to the number of service in the system 210. A service coordination system 213 communicates with the hosts 211 and with the services 212 to thereby provide services requested by the clients 201, and other services (such as authentication, billing, and so forth) that may be prerequisites for the requested service.

Figure 4:
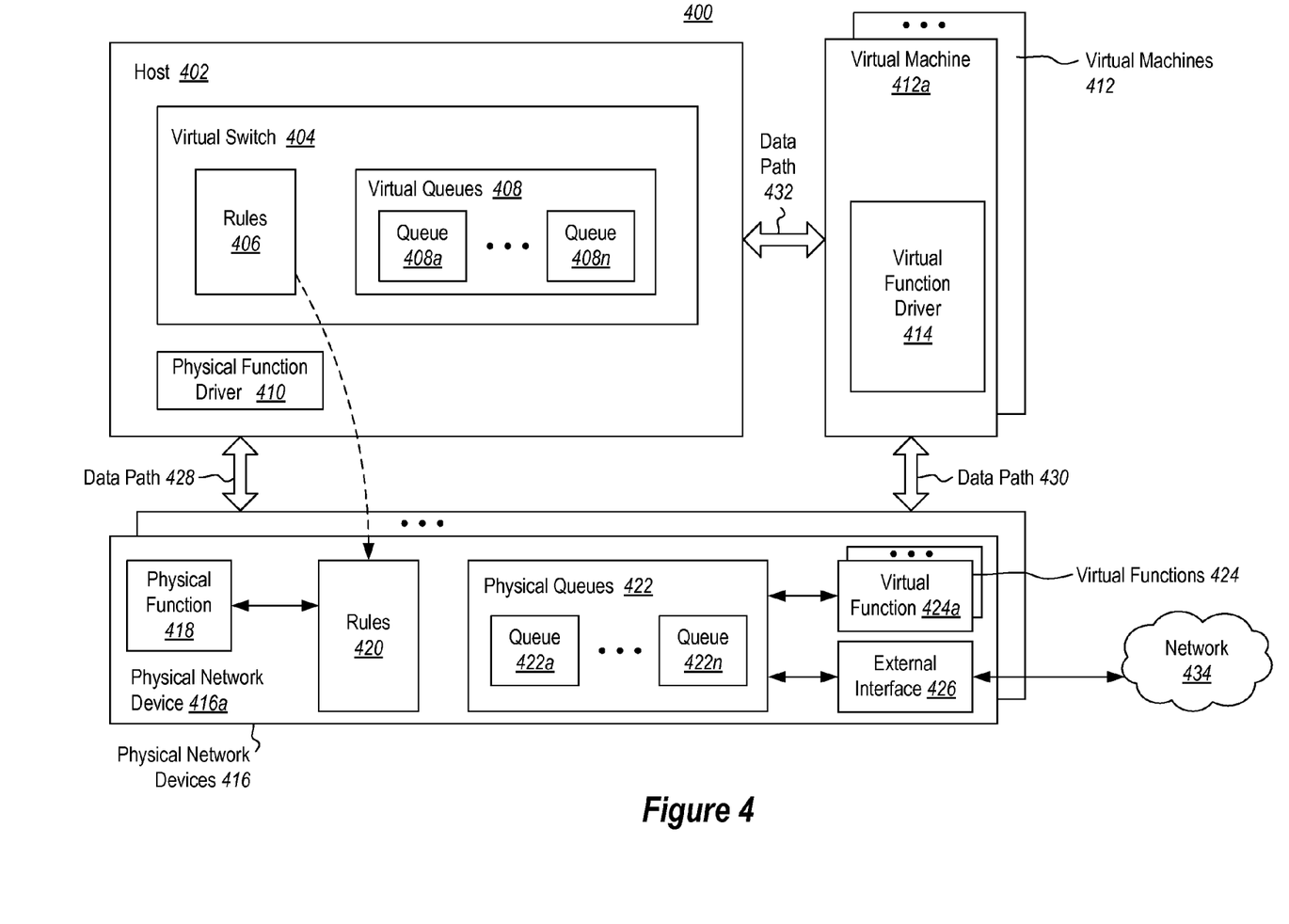
FIG. 4 illustrates an example computer architecture that facilitates offloading virtual machine flows to physical queues.

Turning now to FIG. 4, FIG. 4 illustrates an example computer architecture 400 that facilitates offloading virtual machine flows to physical queues. As depicted, computer architecture 400 includes host 402, one or more virtual machines 412 (including virtual machine 412a), and one or more physical network devices 416 (including physical network device 416a).

Host 402 is configured to provide a virtualization environment. In some embodiments, host 402 may correspond to host 300 of FIG. 300. For example, host 402 may include a parent partition (which executes a host operating system) and one or more child partitions. Each child partition can be viewed as providing a virtualized hardware environment for executing a corresponding virtual machine, such as virtual machine 412a. Host 402 may be used a part of a cloud computing environment that hosts virtual machines on behalf of tenants.

Each of virtual machines 412 (including virtual machine 412a) executes one or more virtualized applications, such as an operating system, application software, etc. Each of virtual machines 412 is capable of sending and receiving network packets. For example, each of virtual machines 412 includes a network stack (e.g., a TCP/IP stack) and is capable of sending and/or receiving network packets and other information through host 402 over data path 432 and/or through physical network devices 416 over data path 430. As such, virtual machines 412 can create network flows.

Each physical network device 416 is connected to other computer systems and/or networks using one or more external interfaces. FIG. 4 depicts that physical network device 416a is connected to network 434 using external interface 426. Physical network devices 416 can include any appropriate type of physical networking hardware, such as NICs, switches, etc.

In addition, each physical network device 416 comprises physical hardware that is compatible with a virtualized environment. For example, FIG. 4 depicts that physical network device 416a presents virtual functions 424 to virtual machines 412. In particular, physical network device 416a may present one or more virtual functions to each of virtual machines 412. For example, FIG. 4 depicts that physical network device 416a presents virtual function 424a to virtual machine 412a. Each of virtual machine 412, in turn, includes a corresponding virtual function driver. For example, FIG. 4 depicts that virtual machine 412a includes virtual function driver 414. As such, each of virtual machines 412 can access its corresponding virtual function 424 over data path 430, and can use data path 430 to communicate network packets with physical network device 416a without routing the network packets through host 402. Doing so can reduce processor usage and network latency when compared to routing network packets through host 402.

In addition, FIG. 4 also depicts that physical network device 416a presents physical function 418 to host 402. FIG. 4 also depicts that host 402 includes a corresponding physical function driver 410, and that data path 428 connects physical function 418 at physical network device 416a and physical function driver 410 at host 402. As such, physical function 418 and physical function driver 410 can operate for exchange of network packets between physical network device 416a and host 402.

As indicated previously, physical NIC 110 may, in some embodiments, comprise PCIe hardware that is SRIOV-compliant. In such embodiments, one or more of virtual functions 424 or physical function 418 may comprise PCIe functions. However, it will be appreciated that the principles described herein may be applicable to a variety of hardware devices, and are not limited to SRIOV-compliant devices or to PCIe devices.

Each of physical network devices 416 can include one or more physical queues, which can be used by physical network devices 416 when processing network flows that are associated with virtual machines 412. For example, FIG. 4 depicts that physical network device 416a includes physical queues 422, including queue 422a and any additional number (i.e., zero or more) of additional physical queues, as represented by the horizontal ellipses and queue 422n. According to one or more embodiments, host 402 configures one or more of physical network devices 416 to manage use of its physical queues when processing network flows for virtual machines 412. As depicted, for example, virtual switch 404 at host 402 can include rules 406. Using rules 406, virtual switch 404 can program physical network device 416a with rules 420, and can program physical network device 416a to manage network flow assignments to physical queues 422 based on those rules. Rules 420 may be identical to rules 406, may be altered in some manner, and/or may include a subset of rules 406. As such, physical network device 416a can be configured to efficiently handle network flows from virtual machines 412, including making assignments of network flows to physical queues 422, without involving host 402 for every network flow.

Rules 420 can include rules that enable physical network device 416a to assign a number network flows to physical queues 422 that is greater in number than a number of queues present at physical queues 422. In a simple example, network traffic from virtual machines 412 may involve eight active network flows, but physical network device 416a may use rules 420 to assign these eight flows to only four available queues in physical queues 422. Physical network device 416a can be configured to make network flow to queue assignments based on characteristics of the flows, and/or based on classifications of the flows. In some embodiments, physical network device 416a places network flows into different classifications based on characteristics of the flows and based on rules 420. In some additional or alternative embodiments, physical network device 416a places network flows into different classifications based on suggestions made by virtual machines 412. For example, virtual machine 412a may attach some attribute to a flow, or may communicate a suggested classification to physical function 418 separate from the flow.

Rules 420 can enable various types of queue assignment algorithms. For example, rules 420 may specify that a plurality of network flows having a relatively low traffic level maybe assigned together on a single physical queue, while flows having a relatively high traffic level are to each be assigned exclusively to corresponding physical queue. In another example, rules 420 may specify that a plurality of flows having similar or compatible requirements are be combined on the same queue. For example, if network packets of a plurality of flows are to be paced (rate limited) at a similar rate, those flows may be assigned together on a single physical queue. Other similar or compatible requirements may include priority (e.g., grouping flows of low priority together on a single queue), quality of service (QoS) (e.g., grouping flows with low QoS requirements together on a single queue), etc. Rules 420 may also specify that flows from the same virtual machine are to be grouped onto a single physical queue or group of physical queues. As such, the embodiments herein can facilitate the partitioning of hardware resources among virtual machines 412.

In some embodiments, physical network devices 416 and virtual switch 404 can work together to balance execution of network flows therebetween. For example, FIG. 4 depicts that virtual switch 404 can include software-based virtual queues 408 (including queue 408a and any additional number (i.e., zero or more) of additional queues, as represented by the horizontal ellipses and queue 408n). As such, some network flows may be assigned to physical queues 422, and some flows may be assigned to virtual queues 408. One will appreciate that physical queues 422 may provide faster, more granular, and/or more reliable performance than virtual queues 408. As such, network flows may be classified into flows that should be assigned to physical queues 422 to take advantage of the faster, more granular, and/or more reliable performance at physical network device 416a, and flows that may be assigned to virtual queues 408 at host 402 because fast, granular, and/or reliable performance may not be as important for these flows. Such an assignment may be suggested by virtual machines 412, and/or may be made by physical network devices 416 and/or virtual switch 404.

In some embodiments, a flow may pass through a plurality of physical network devices 416 (e.g., a NIC and a switch), and host 402 can program each physical network device to handle the flow independently. For example, one physical network device may be programmed to assign the flow to a single physical queue at the device, while another physical network device may be programmed to assign combine the flow with other flows at a single physical queue at the device.

Figure 5:
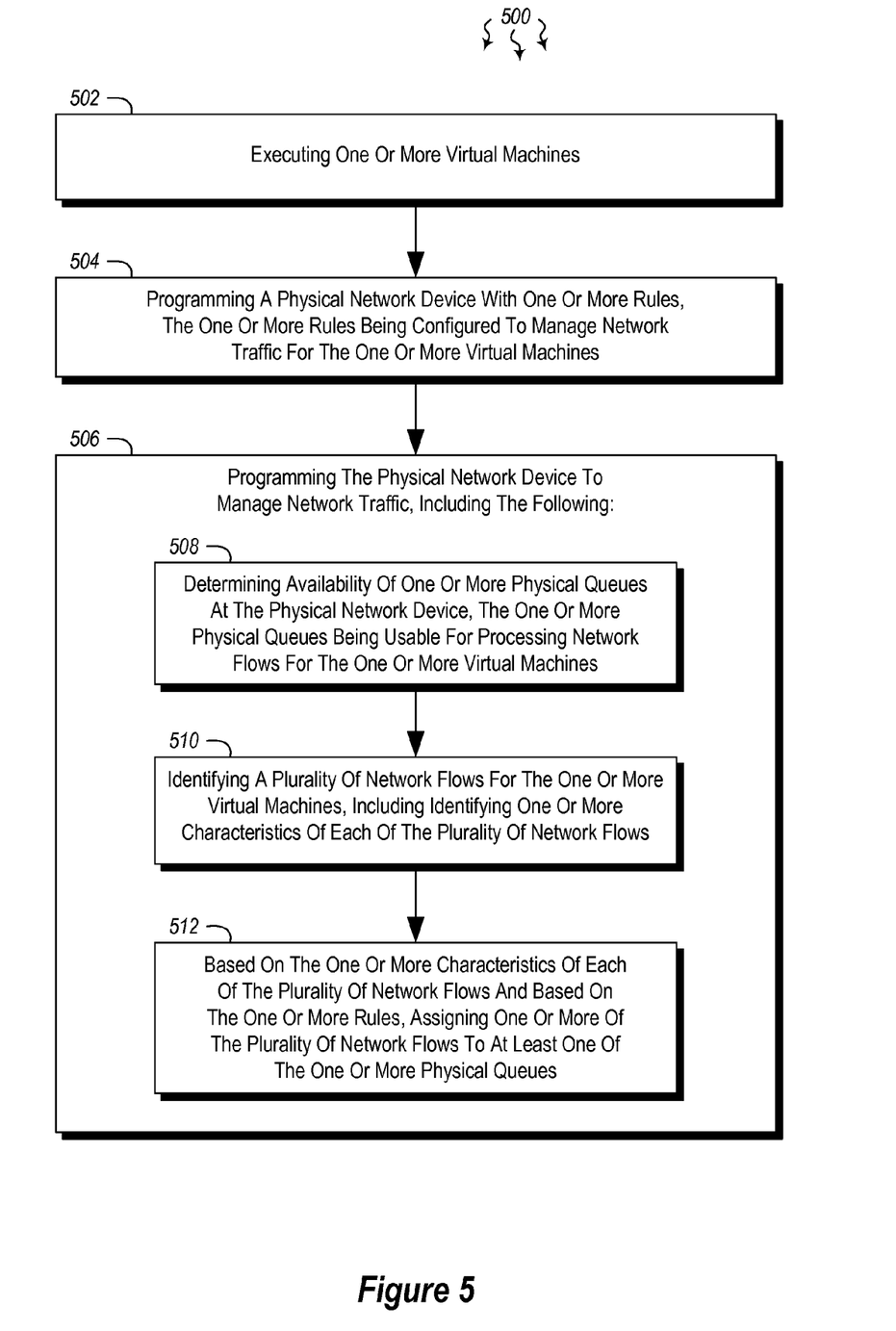
FIG. 5 illustrates a flow chart of an example method for managing network traffic.

FIG. 5 illustrates a flowchart of a method 500 for managing network traffic. Method 500 will be described with respect to the components and data of computer architecture 400.

Method 500 includes an act of executing one or more virtual machines (act 502). For example, host 402 can execute virtual machines 412, which can include virtual machine 412a. In some embodiments, act 502 can include executing the virtual machine(s) in a para-virtualized manner, including using one or more SRIOV-compliant physical network devices. As such, at least one physical network device (e.g., physical network device 418) may present a virtual function (e.g., virtual function 424a) to virtual machine 412a, and virtual machine 412a may include a corresponding virtual function driver (e.g., virtual function driver 414) for communicating network packets directly with the physical network device.

Method 500 also includes an act of programming a physical network device with one or more rules, the one or more rules being configured to manage network traffic for the one or more virtual machines (act 504). For example, virtual switch 404 can program physical network device 416a with rules 420. Rules 420 can be a copy of, or be based on, rules 406 at virtual switch 404. Rules 420 can be configured to enable physical network device 416a to make assignments between network flows associated with virtual machines 412 and physical queues 422 at physical network device 416a.

Method 500 also includes an act of programming the physical network device to manage network traffic (act 506). For example, virtual switch 404 can configure physical network device 416a to make flow assignments based on rules 420. In some embodiments, programming physical network device 416a to manage network traffic occurs as a consequence of programming physical network device 416a with rules 420. In other embodiments, programming physical network device 416a to manage network traffic includes expressly programming physical network device 416a with additional computer-executable instructions and/or additional configuration settings.

Act 506 includes programming the physical network device to determine availability of one or more physical queues at the physical network device, the one or more physical queues being usable for processing network flows for the one or more virtual machines (act 508). For example, physical network device 416a can be configured to identify physical queues 422, including a present availability of physical queues 422.

Act 506 includes programming the physical network device to identify a plurality of network flows for the one or more virtual machines, including identifying one or more characteristics of each of the plurality of network flows (act 510). For example, physical network device 416a can be configured to identify network flows that are associated with virtual machines 412. Physical network device 416a can also be configured to analyze characteristics of the flows, categorization suggestions from virtual machines 412, or any other appropriate information, to classify or otherwise categorize the flows.

Act 506 includes programming the physical network device to, based on the one or more characteristics of each of the plurality of network flows and based on the one or more rules, assign one or more of the plurality of network flows to at least one of the one or more physical queues (act 512). For example, based on rules 420, and based on characteristics and categorizations identified in act 510, physical network device 416a can assign the flows to physical queues 422. In doing so, physical network device 416a may assign a number of flows to physical queues 422 that exceeds the number of physical queues. For example, physical network device 416a may assign flows having similar characteristics, compatible priorities or traffic loads, etc. to the same physical queue. Additionally or alternatively, physical network device 416a may work with virtual switch 404 to assign a first subset of flows to virtual queues 408 at virtual switch 404 and a second subset of flows to physical queues 422 at physical network device 416*a*.

Accordingly the embodiments described herein can improve network performance and utilization of physical hardware by enabling a physical network device to make assignments between flows and physical queues. When making such assignments, the embodiments described herein can enable the physical hardware to process a greater number of flows with physical queues than the number of physical queues are available. Additionally or alternatively, when making such assignments, the embodiments described herein can enable the physical hardware to balance processing of flows between physical queues and virtual queues.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A virtualization host computer system that is configured to manage network traffic for one or more virtual machines that are executing at the virtualization host computer system, the virtualization host computer system comprising:
    one or more processors;
    one or more physical network devices; and
    one or more hardware storage devices having stored thereon computer-executable instructions that, when executed by the one or more processors, cause the virtualization host computer system to execute a virtual switch, the virtual switch being configured for processing a plurality of network flows for the one or more virtual machines at one or more virtual queues, the virtual switch also being configured to program each of the one or more physical network devices with one or more corresponding rules for offloading network flows and to perform the following based on the one or more rules:
        determine availability of one or more physical queues at the physical network device, each of the one or more physical queues being usable for offloading one or more of the plurality of network flows for the one or more virtual machines from the virtual switch at the virtualization host computer system;
        identify a first subset of the plurality of network flows for the one or more virtual machines that are to be offloaded from the virtual switch at the virtualization host computer system to the one or more physical queues, based on one or more characteristics of each of the plurality of network flows, including determining that both a first and second flow of the first subset of network flows are to be concurrently offloaded to a first physical queue of the one or more physical queues based on the first and second flows each having a relatively low traffic level compared to a third flow of the subset of network flows, and determining that the third flow is to be uniquely offloaded to a second physical queue of the one or more physical queues based on the third flow having a relatively high traffic level compared to the first and second flows; and
        offloading the first subset of the plurality of network flows to the one or more physical queues, including concurrently offloading the first and second flows to the first physical queue and uniquely offloading the third flow to the second physical queue, wherein a second subset of the plurality of network flows for the one or more virtual machines remain at the one or more virtual queues of the virtual switch at the virtualization host computer system.

2. The virtualization host computer system as recited in claim 1, further comprising:
    determining one or more flows that are assigned to the first subset and one or more flows that are assigned to the second subset based on one or more suggestions from at least one virtual machine.

3. The virtualization host computer system as recited in claim 1, wherein the at least two of the first subset of network flows are concurrently offloaded to a single physical queue based on the at least two of the first subset of network flows having similar rate limiting characteristics.

4. The virtualization host computer system as recited in claim 1, wherein the at least two of the first subset of network flows are concurrently offloaded to a single physical queue based on the at least two of the first subset of network flows being associated with the same virtual machine.

5. The virtualization host computer system as recited in claim 1, wherein the one or more physical network devices include a physical network interface card.

6. The virtualization host computer system as recited in claim 1, wherein the one or more physical network devices include a physical switch.

7. The virtualization host computer system as recited in claim 1, wherein the at least two of the first subset of network flows are concurrently offloaded to a single physical queue based on the at least two of the first subset of network flows having the same priority.

8. The virtualization host computer system as recited in claim 1, wherein the at least two of the first subset of network flows are concurrently offloaded to a single physical queue based on the at least two of the first subset of network flows having the same Quality of Service (QoS).

9. A method, implemented at a computer system that includes one or more processors and one or more physical network devices, for managing network traffic, the method comprising:
    executing one or more virtual machines;
    executing a virtual switch, the virtual switch being configured for processing a plurality of network flows for the one or more virtual machines at one or more virtual queues;
    programming a physical network device with one or more rules for offloading network flows, the one or more rules being configured to manage network traffic for the one or more virtual machines; and
    programming the physical network device to manage network traffic, including the following:
        determining availability of one or more physical queues at the physical network device, each of the one or more physical queues being usable for offloading one or more of the plurality of network flows for the one or more virtual machines from the virtual switch at the virtualization host computer system;
        identifying a first subset of the plurality of network flows for the one or more virtual machines that are to be offloaded from the virtual switch at the virtualization host computer system to the one or more physical queues, based on one or more characteristics of each of the plurality of network flows, including determining that both a first and second flow of the first subset of network flows are to be concurrently offloaded to a first physical queue of the one or more physical queues based on the first and second flows each having a relatively low traffic level compared to a third flow of the subset of network flows, and determining that the third flow is to be uniquely offloaded to a second physical queue of the one or more physical queues based on the third flow having a relatively high traffic level compared to the first and second flows; and offloading the first subset of the plurality of network flows to the one or more physical queues, including concurrently offloading the first and second flows to the first physical queue and uniquely offloading the third flow to the second physical queue, wherein a second subset of the plurality of network flows for the one or more virtual machines remain at the one or more virtual queues of the virtual switch at the virtualization host computer system.

10. The method as recited in claim 9, wherein the at least two of the first subset of network flows are concurrently offloaded to a single physical queue based on the at least two of the first subset of network flows having similar rate limiting characteristics.

11. The method as recited in claim 9, wherein the at least two of the first subset of network flows are concurrently offloaded to a single physical queue based on the at least two of the first subset of network flows being associated with the same virtual machine.

12. The method as recited in claim 9, wherein the one or more physical network devices include one or more of a physical network interface card or a physical switch.

13. The method as recited in claim 9, wherein the at least two of the first subset of network flows are concurrently offloaded to a single physical queue based on the at least two of the first subset of network flows having the same priority.

14. The method as recited in claim 9, wherein the at least two of the first subset of network flows are concurrently offloaded to a single physical queue based on the at least two of the first subset of network flows having the same Quality of Service (QoS).

15. One or more hardware storage devices having stored thereon computer-executable instructions that, when executed by one or more processors, cause a virtualization host computer system to execute a virtual switch, the virtual switch being configured for processing a plurality of network flows for the one or more virtual machines at one or more virtual queues, the virtual switch also configured to program one or more physical network devices with one or more corresponding rules for offloading network flows and to perform the following based on the one or more rules:

determine availability of one or more physical queues at the physical network device, each of the one or more physical queues being usable for offloading one or more of the plurality of network flows for the one or more virtual machines from the virtual switch at the virtualization host computer system;

identify a first subset of the plurality of network flows for the one or more virtual machines that are to be offloaded from the virtual switch at the virtualization host computer system to the one or more physical queues, based on one or more characteristics of each of the plurality of network flows, including determining that both a first and second flow of the first subset of network flows are to be concurrently offloaded to a first physical queue of the one or more physical queues based on the first and second flows each having a relatively low traffic level compared to a third flow of the subset of network flows, and determining that the third flow is to be uniquely offloaded to a second physical queue of the one or more physical queues based on the third flow having a relatively high traffic level compared to the first and second flows; and offloading the first subset of the plurality of network flows to the one or more physical queues, including concurrently offloading the first and second flows to the first physical queue and uniquely offloading the third flow to the second physical queue, wherein a second subset of the plurality of network flows for the one or more virtual machines remain at the one or more virtual queues of the virtual switch at the virtualization host computer system.

16. The one or more hardware storage devices as recited in claim 15, wherein the at least two of the first subset of network flows are concurrently offloaded to a single physical queue based on the at least two of the first subset of network flows having similar rate limiting characteristics.

17. The one or more hardware storage devices as recited in claim 15, further comprising:

determining one or more flows that are assigned to the first subset and one or more flows that are assigned to the second subset based on one or more suggestions from at least one virtual machine.

18. The one or more hardware storage devices as recited in claim 15, wherein the at least two of the first subset of network flows are concurrently offloaded to a single physical queue based on the at least two of the first subset of network flows being associated with the same virtual machine.

19. The one or more hardware storage devices as recited in claim 15, wherein the at least two of the first subset of network flows are concurrently offloaded to a single physical queue based on the at least two of the first subset of network flows having the same priority.

20. The one or more hardware storage devices as recited in claim 15, wherein the at least two of the first subset of network flows are concurrently offloaded to a single physical queue based on the at least two of the first subset of network flows having the same Quality of Service (QoS).

* * * * *